(12) United States Patent
Oorschot

(10) Patent No.: US 7,448,158 B2
(45) Date of Patent: Nov. 11, 2008

(54) METHOD AND DEVICE FOR COLLECTING ANIMALS IN OR ON A WATER BOTTOM

(75) Inventor: Ronald Willem Arie Oorschot, Goes (NL)

(73) Assignee: Nederlandse Organisatie voor toegepast-natuurwetenschappelijk Onderzoek TNO, Delift (NL)

( * ) Notice: Subject to any disclaimer, the term of this patent is extended or adjusted under 35 U.S.C. 154(b) by 0 days.

(21) Appl. No.: 10/511,287

(22) PCT Filed: Apr. 22, 2003

(86) PCT No.: PCT/NL03/00298

§ 371 (c)(1),
(2), (4) Date: Oct. 14, 2004

(87) PCT Pub. No.: WO03/088742

PCT Pub. Date: Oct. 30, 2003

(65) Prior Publication Data

US 2005/0160655 A1 Jul. 28, 2005

(30) Foreign Application Priority Data

Apr. 22, 2002 (NL) .................................. 1020451

(51) Int. Cl.
*A01K 73/02* (2006.01)
*A01K 79/00* (2006.01)
*A01K 80/00* (2006.01)

(52) U.S. Cl. ................. 43/9.4; 43/9.1; 43/9.6; 43/6.5; 37/316

(58) Field of Classification Search .................... 43/6.5, 43/9.1, 9.4, 9.6, 17.1, 9.3; 37/315, 316, 323, 37/55
See application file for complete search history.

(56) References Cited

U.S. PATENT DOCUMENTS

| 279,373 | A | * | 6/1883 | Friend | 37/316 |
| 546,181 | A | * | 9/1895 | Nielsen | 37/316 |
| 820,595 | A | * | 5/1906 | Norton | 37/316 |
| 1,250,288 | A | * | 12/1917 | Delvin | 37/316 |
| 1,323,122 | A | * | 11/1919 | Taylor | 37/316 |
| 1,388,414 | A | * | 8/1921 | Dros | 43/6.5 |
| 1,415,113 | A | * | 5/1922 | Phillips, Jr. | 43/6.5 |
| 1,703,402 | A | * | 2/1929 | Matsuoka | 37/316 |

(Continued)

FOREIGN PATENT DOCUMENTS

DE 19914703 A1 * 10/1999

(Continued)

*Primary Examiner*—Darren W Ark
(74) *Attorney, Agent, or Firm*—Hoffman & Baron, LLP

(57) ABSTRACT

A method and device for collecting animals living on or in a water bottom such as crustaceans and shellfish and fish, wherein a collecting device (5) is moved over the bottom, which collecting device is provided with a device for moving the animals from or off the water bottom, in particular at least one tine (14) that can penetrate into the bottom and with which said animals can be taken or forced from or off the bottom, while said at least one tine is provided with a fluid outlet through which under pressure, a fluid, in particular water, is forced into the bottom, such that a top layer of the bottom is stirred up and animals living therein or thereon are dislodged, which animals are captured in the collecting device.

14 Claims, 3 Drawing Sheets

U.S. PATENT DOCUMENTS

| | | | | |
|---|---|---|---|---|
| 1,792,592 A * | 2/1931 | Lewis | | 37/316 |
| 2,217,412 A * | 10/1940 | Jackson et al. | | 37/315 |
| 2,610,458 A * | 9/1952 | Hay et al. | | 43/9.1 |
| 3,297,980 A * | 1/1967 | Haslett | | 367/97 |
| 3,462,858 A * | 8/1969 | Francklyn | | 37/315 |
| 3,491,474 A * | 1/1970 | Metcalf | | 43/9.6 |
| 3,521,386 A * | 7/1970 | Francklyn | | 37/315 |
| 3,561,150 A * | 2/1971 | Silchenstedt | | 43/4.5 |
| 3,608,217 A * | 9/1971 | Voisin, Sr. | | 43/9.4 |
| 3,624,932 A * | 12/1971 | Doyle | | 37/315 |
| 3,651,595 A * | 3/1972 | Newman | | 43/9.6 |
| 3,777,388 A * | 12/1973 | Newman et al. | | 43/9.6 |
| 3,862,502 A * | 1/1975 | Young | | 37/316 |
| 4,112,602 A * | 9/1978 | Kato et al. | | 37/316 |
| 4,425,723 A * | 1/1984 | Erlandsen | | 37/316 |
| 4,563,830 A * | 1/1986 | Cain et al. | | 43/4.5 |
| 5,027,533 A * | 7/1991 | Holt et al. | | 37/316 |
| 5,644,863 A * | 7/1997 | Verburg | | 43/9.6 |
| 5,797,210 A * | 8/1998 | Verburg | | 43/9.6 |
| 5,970,635 A * | 10/1999 | Wilmoth | | 37/323 |
| 6,132,303 A * | 10/2000 | Buckhaven | | 452/59 |

FOREIGN PATENT DOCUMENTS

| | | | |
|---|---|---|---|
| EP | 691077 A1 * | 1/1996 | |
| GB | 2332848 A * | 7/1999 | |
| JP | 06000043 A * | 1/1994 | |
| JP | 10084816 A * | 4/1998 | |
| NL | 6716418 | 6/1969 | |
| WO | WO 9103158 A1 * | 3/1991 | |

* cited by examiner

METHOD AND DEVICE FOR COLLECTING ANIMALS IN OR ON A WATER BOTTOM

This application is the U.S. National Phase of International Application Number PCT/NL03/00298 filed on 22 Apr. 2003, which is incorporated herein by reference.

BACKGROUND OF THE INVENTION

The invention relates to a method for collecting animals living in or on a water bottom. In particular, the invention relates to a method for collecting crustaceans and shellfish and/or fish living in or on a sea bottom.

As a rule, crustaceans and shellfish living on or in the sea bottom are fished with the aid of trawls which are dragged along the sea bottom. Such trawls are provided with knives reaching into the bottom such that the knives are pulled through the sea bottom with a cutting edge forward. A jet of water is directed at an obtuse angle, in particular approximately at right angles to the direction of movement, approximately vertically to the sea bottom, under high pressure, directly in front of the knives so that the soil of the sea bottom is stirred up and raised. As a result, the crustaceans and shellfish, such as cockles, are disengaged and can move over and/or along the knives. Behind the knives, in the trawl, a collecting basket is arranged in which the crustaceans and shellfish are caught while mud, sand, sediment, undersized shellfish and the like can flow back through the basket. The animals are discharged via a tube system to the craft trawling the trawl.

When using this known method, the sea bottom is agitated in a number of ways which may lead to damage to the environment. For instance, as a result of the water injection and, in particular, the pressure and direction of the jet of water, a relatively large mass of sediment is flushed from the bottom and brought into the water. Moreover, relatively deep, long furrows are made by the knives in the sea bottom. The trawl is heavy so as not to lose contact with the sea bottom. The fact is that as a result of, on the one hand, the trawling force applied to the trawl by the craft and, on the other hand, the force of the jet of water directed approximately vertically, during use, a buoyant force is applied to the trawl which must be compensated by the self-weight of the trawl. This relatively heavy weight of the trawl is borne by runners with which the trawl rests on the sea bottom. These runners cause a further disturbance of the sea bottom, at least of the sediment, growth, marine animals et cetera. When using the trawl on a relatively weak bottom, furrows which are drawn by the trawl in the bottom will be relatively deep, so that the bottom disturbance will be further enhanced.

The invention contemplates a method for collecting animals living in or on a water bottom, wherein the abovementioned drawbacks have been avoided, at least partly, while maintaining the advantages of the known method. To that end, the method according to the present invention is characterized by a collecting device moved over the bottom, which collecting device is provided with means for moving the animals from or off the water bottom, in particular at least one tine that can penetrate into the bottom and with which said animals can be taken or forced from or off the bottom, while said at least one tine is provided with fluid outlet means through which, under pressure, a fluid, in particular water is forced into the bottom, such that a top layer of the bottom is stirred up and animals living therein or thereon are dislodged, which animals are caught in the collecting device.

SUMMARY OF THE INVENTION

With a method according to the invention, water or a different fluid such as, for instance, gas, compressed or not compressed or slurry is introduced into the bottom under pressure, directly above, below or in front of a or each tine, only at that location where the soil is to be loosened somewhat. The bottom is stirred up no more than necessary for disengaging the animals. Preferably, the fluid is introduced into the water bottom at a very small angle, or, more in particular, approximately parallel to the bottom surface, for instance only a few centimeters below the bottom surface, so that the water bottom is only minimally agitated.

As a consequence of this method, the advantage is achieved that through the jet or jets the device will experience virtually no forces directed away from the sea bottom and therefore will no longer be pushed upwards, so that this device can be of a lighter design and hence will lead to less disturbance of the sea bottom. Moreover, less fluid, in particular water, is to be introduced into the soil, so that less energy is required and the disturbance is even more reduced. As a result of the relatively light weight, moreover, the power required for advancing the device is reduced so that environmental advantages are achieved, while, furthermore, less turbulence occurs in the water as a result of the craft's drive.

With a method according to the invention, further, the advantage is achieved that the chance of animals escaping underneath the tines is considerably reduced. The fact is that the extent to which the bottom, for instance, the sediment, is agitated is relatively small. Only the part in which the shellfish or on which the fish are present, is agitated and loosened. Therefore, the animals can practically not move downwards or be moved downwards.

In this application, tine is at least understood to mean a portion of the trawl or a part attached thereto such as a part which is usually indicated as a knife. With a device and method according to the invention a fluid can be supplied through or along the tines and be squeezed or blown out, to which end separate outflow means can be provided.

As a result of the relatively local and particularly limited disturbance of the water bottom, the animals, in particular the fish, will behave more calmly. Thus, the additional advantage can be achieved that the animals will experience less stress and will become less contaminated, i.e. will take up less sand, particularly the crustaceans and shellfish, so that the quality of the animals collected is even more increased.

In a further elaboration, a method according to the invention is preferably characterized by a detection means provided in front of the at least one tine, with which the presence of animals in or on the bottom is detected, while operating means are provided for moving the at least one tine, which are activated on the basis of signals of the detecting means, the arrangement being such that the at least one tine is only moved into the bottom when the detecting means in front of the respective tine detect the presence of animals in or on the bottom, and is moved from the bottom again when no more animals are detected in front of the respective tine. The operating means can also be provided for controlling electric means arranged near the tines, for generating current impulses and/or an electric and/or magnetic field, which means are activated on the basis of signals of the detecting means, the arrangement being such that said electric means are only activated when the detecting means in front of the respective tine detect the presence of animals in or on the bottom and are moved from the bottom again when no more animals are detected in front of the respective tine.

With such a method, with the aid of detection means, the presence of animals in or on the bottom is detected, on the basis of which means for moving the animals from or off the bottom can be selectively controlled. This means that the disturbance of the sea bottom can be reduced even further. The fact is that through this method, it can be ensured that the sea bottom is only disturbed by the means for moving the animals from of off the sea bottom when such an animal has been detected by the detecting means. There where no animals are detected, at least too small a density of animals, the respective means will be brought or kept in a position of rest so that no, at least minimal disturbance of the bottom occurs. An additional advantage is that the energy required for collecting is further reduced. The fact is that when no animals are detected, for instance, no tines will reach into the bottom and effect resistance and no electrical means will have to be controlled for startling the animals.

For locally and purposely startling the animals such as fish, naturally, different means can also be utilized, for instance mechanical means such as chains which can be specifically controlled on the basis of a signal—coming from a detection means, sound or other vibration sources, air or other fluid sources, specifically controllable and the like.

In a further elaboration, a method according to the invention is preferably characterized by the animals being detected with the aid of sound, in particular ultrasonic sound measurement.

By using sound ranging, in particular ultrasonic sound ranging, the advantage is achieved that in a particularly simple and accurate manner animals can be detected and distinguished from the bottom as such and other objects present in or on the bottom, growths and the like.

Naturally, also different detecting means can be used, for instance feelers which can recognize the bottom structure or elevations on the bottom, image recognition means such as cameras and the like, heat sensors and the like. With these, for instance humps, raised by animals living in the bottom, can be detected and recognized on the basis of which the collecting means such as tines or startling means can be controlled or populations be determined.

The animals disengaged from the bottom with the aid of the device can be collected in a simple manner, by using, for instance, collecting baskets known per se and discharge means, trawling nets and the like.

The invention further relates to a device for collecting animals living on or in a water bottom characterized by supporting means for support on a water bottom, detecting means for detecting animals in or on the water bottom, and means for moving the animals from of off the water bottom, drivable on the basis of a signal to be delivered by the detecting means.

Through the use of the respective detecting means, collection can take place accurately there where the animals are present, at least in a desired concentration, while at other positions, for instance there where no or only little animals are present, the sea bottom can at least virtually be left undisturbed. As a result, damage to the environment is reduced to a minimum, the desired animals can be collected rapidly and easily. The device can be of relatively light design.

In an advantageous embodiment, a device according to the invention is characterized by the means for moving the animals from of off the water bottom comprising at least one tine which, during use, can extend below a plane defined by the undersides of the supporting means, at least into the bottom, and water supply means for, during use, introducing water under pressure into the bottom, at most at a gentle angle relative to and preferably approximately parallel to said plane, at least to a bottom over which the device can be moved.

In such an embodiment, water or a different fluid such as gas or slurry can be introduced into the bottom through or along at least one tine, preferably at a slight angle or approximately parallel to the bottom surface directly at the location of the respective tine, such that water under pressure can be inserted into the bottom relatively flat and agitates only a top layer of the bottom. The fluid supply means can for instance be designed such and set such that only a few centimeters of the water bottom are stirred up. As a result hereof, animals present directly below this surface such as crustaceans and shellfish, for instance cockles, can simply be taken from the water bottom by the or each tine, and be discharged.

It is preferred that a row of tines is provided, which row preferably extends approximately transversely to the direction of movement of the device.

In a preferred embodiment, a device according to the invention is characterized by means provided for moving the or each tine between a first position in which the respective tine extends, during use, at least partly into the bottom, and a second position in which the respective tine extends at least partly and preferably wholly above the bottom.

With such an embodiment, during use, one or more tines can be moved into and out of the water bottom, in particular a sea bottom, depending of the presence or absence of animals to be taken up, at least in a desired concentration.

In a further alternative embodiment, a device according to the invention is further characterized by means for moving the animals from of off the water bottom comprising electric or mechanical means for generating a current surge and/or a magnetic and/or electric field and/or a vibration field.

In such an embodiment, animals such as fish living on the bottom, for instance flatfish, can simply be startled such that these animals are disengaged from the bottom with minimal stress and can be caught in a net. Preferably, a series of electric means is provided, as well as a series of detecting means, such that over a relatively large width animals can be detected at different positions in front of the device and depending thereon can be startled. Naturally, also different means can be used for startling the animals, for instance mechanical and/or acoustic and/or fluid blowing or spouting means, controllable on the basis of detection signals, as described hereinabove with reference to a method according to the invention.

The invention further relates to a device according to the invention, combined with a craft, wherein between the craft and the device a flexible hose or tube is provided through which water can be supplied to the device and/or the animals can be moved from the device to the craft. Use of such a flexible hose or tube offers the advantage over the use of customary rigid tubes that with it, virtually no forces, at least no buoyant forces are applied to the device, so that the craft is prevented even better from coming free from the bottom, for instance upon changes of speed, changes of depth and the like.

In the further subclaims, other advantageous embodiments of a method and device of the invention are represented.

BRIEF DESCRIPTION OF THE DRAWINGS

In clarification of the invention, exemplary embodiments of a method and device according to the invention will be further elucidated with reference to the drawing. In the drawing.

DETAILED DESCRIPTION OF THE INVENTION

Figure 1:
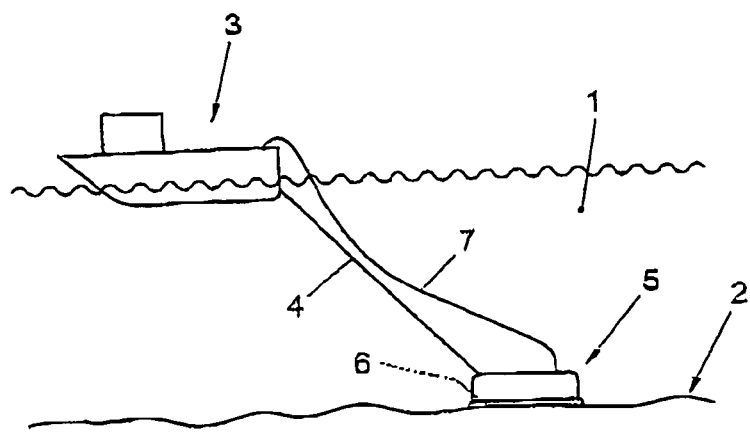
FIG. 1 schematically shows a craft with a device according to the invention, during use.

In this description, identical or corresponding parts have identical or corresponding reference numerals. In this description, the starting point will be devices and methods for collecting crustaceans and shellfish, such as cockles (see, for instance, FIGS. 2 and 3) living in a sea bottom, and devices and methods for collecting fish, such as flatfish (see for instance FIG. 4), living on or in the bottom. In this description, the terms bottom, water bottom and sea bottom are used indiscriminately and are all used to indicate a bottom of a water mass, fresh, brackish or salt, in which fish and/or shellfish and/or crustaceans can be collected. Where, in this text, the term fluid is used, at least also water, gas such as air, slurry and such fluids are understood to be included. As an example, water is used but it can be substituted with any fluid unless expressly indicated differently.

The exemplary embodiments shown in the drawing are only shown by way of example. Combinations of parts of the exemplary embodiments shown are possible within the framework of the invention.

Figure 2:
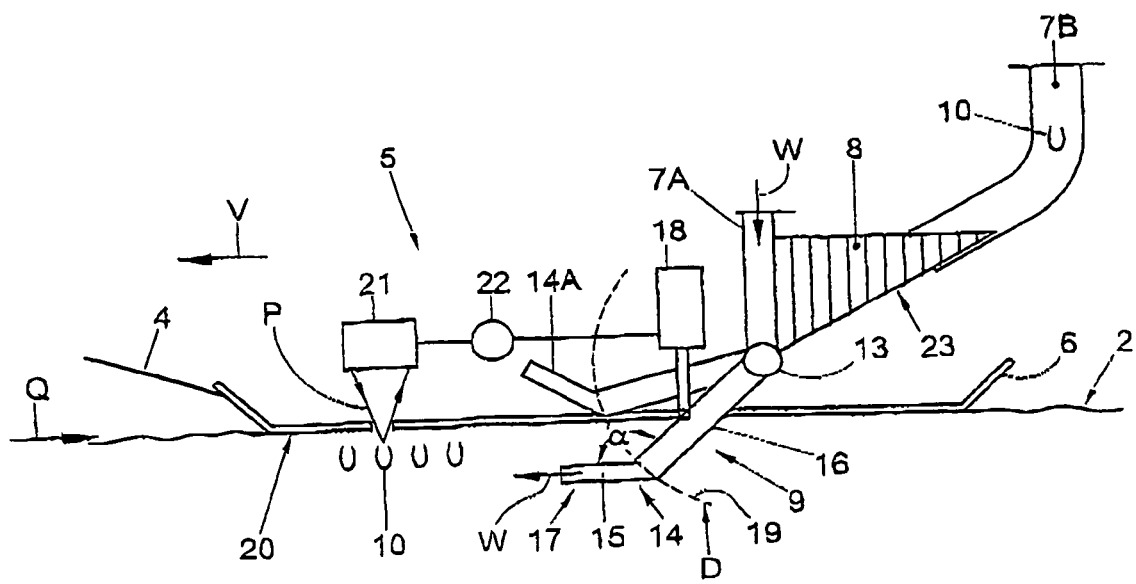
FIG. 2 schematically shows, in side view, a device according to the invention, during use.
Figure 3:
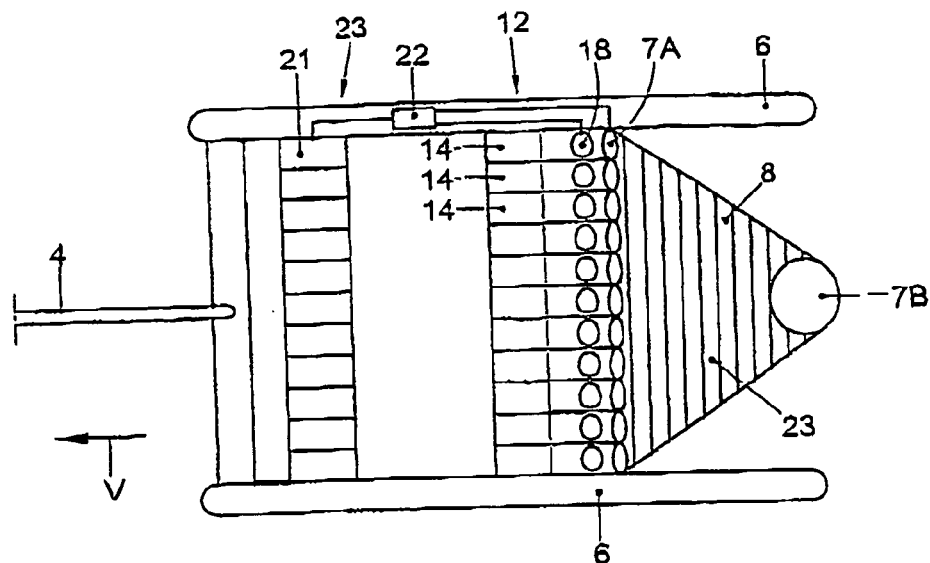
FIG. 3 schematically shows, in top plan view, a device according to the invention with a series of tines and a series of detecting means.
Figure 4:
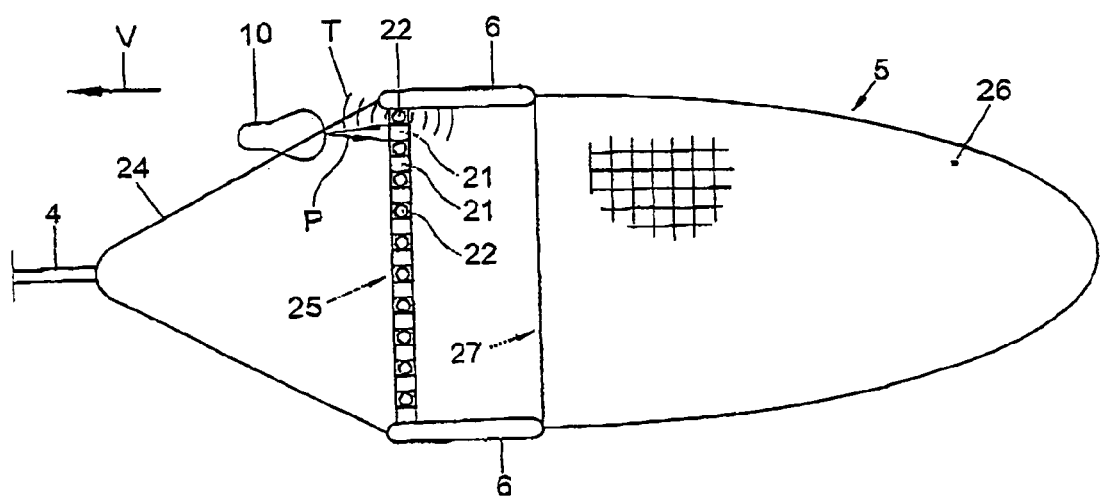
FIG. 4 schematically shows, in top plan view, a device according to the invention with a series of detecting means with associated electric means and a net.

In FIG. 1, schematically in side view, a water mass 1 such as a sea is shown with a water bottom 2, further also indicated as bottom or sea bottom 2. In the water mass 1, a craft 3 is shown, which, via a hauling cable 4, for instance a steel cable, chain or synthetic cable, is connected to a collecting device 5, further also called trawl, which can be dragged along the water bottom 2 via the cable 4. The collecting device 5 is provided with supporting means 6, for instance runners with which the trawl 5 rests on the water bottom 2. In the exemplary embodiments shown in FIGS. 3 and 4, two runners 6 are shown, placed at a mutual distance from each other, for reasons to be mentioned hereinafter. In FIG. 1, the trawl 5 is schematically shown as a rectangle. In FIGS. 2-4, embodiments thereof are shown. Further, between the craft 3 and the collecting device 5, a flexible hose or tube 7 is shown through which water can be supplied under pressure to the collecting device 5, and/or animals collected by the device 5 can be discharged to the craft 3. The hose 7 can for instance be designed to be double-walled, for, on the one hand, supplying fluid and, on the other hand, discharging animals. Optionally, two hoses 7A, 7B can be provided, as shown, for example, in FIG. 2. With such an embodiment, water can be supplied through the first hose or tube 7A, for reasons to be mentioned hereinafter, while through the second tube or hose 7B animals can be discharged. Using one or more flexible tubes or hoses 7 can prevent the trawl 5 from thus being pulled from the water bottom 2. The fact is that in such an embodiment, the device 5 can be pulled entirely, at least substantially, by the cable 4 while the hose or tube 7, 7A, 7B can hang relatively limply. As a result, the trawl 5 can compensate differences in depth of the water mass 1 and different speeds of the craft 3 in a simple manner without having to come free from the water bottom 2 or be pushed into it. However, a hose 7 can also be replaced by relatively rigid tubes known per se.

In FIG. 2, schematically in side view, with one of the supporting means 6 taken away, a device 5 according to the invention is shown, on a water bottom 2. The device 5 is borne by two runners 6, as shown in top plan view in FIG. 3, on which runner a basket 8 is borne, manufactured from, for instance, wire, gauze or the like via which collected animals can be discharged via a tube or hose 7B. Near a side of the basket 8 forward in the direction of movement V, means 9 are provided for having animals 10 such as shellfish (FIG. 2) and fish (FIG. 4) disengage from the water bottom 2. In the embodiment shown in FIGS. 2 and 3 the means 9 between the runners 6 comprise a series 12 of tines 14, also indicated as knives 14, arranged side-by-side and pivotable about an axis 18. Each tine 14 comprises a first part 15 forming a free end and a second part 16 including an angle $\alpha$ with a first part 15, which second part 16 connects the first part 15 to the axis 13 and a water supply hose 7A. The or each tine 14 is for instance of hollow design, while the free end remote from the second part 16 defines a nozzle 17 through which water, under pressure, supplied via the hose 7A, can be forced out of the tine 14. In FIG. 2, the passage of the water through the respective tine 14 is indicated with the arrows W.

Via a piston-cylinder assembly 18, each tine 14 is moveable, in particular pivotable about the axis 13, schematically indicated by the interrupted line 19, between a first position, in which the first part 15 extends approximately parallel to the water bottom 2, at least to a plane defined by the undersides 20 of the runners 6, and a second position (shown in FIG. 2 for a second tine 14A) in which the respective tine 14A extends at least virtually completely above the water bottom 2 between the runners 6. Preferably, the water supply means such as the hose 7A and, for instance, a valve (not shown) arranged in or near the axis 13 are arranged such that water can only be forced out via the nozzle 17 when the respective tine 14 is in or near the first position, so that, with the tine in the second position, no water needs to be forced out.

Viewed in the direction of movement V, in front of the nozzle 17, above the runners 6, a series of detecting means 21 is included, in particular ultrasonic detecting means, a reflected sound of which is symbolically indicated in FIG. 2 by the arrows P. Naturally, also different detecting means can be used, for instance heat sensitive means, mechanical feelers which, as a result of the presence of animals, can observe changes present in the bottom, image recognition means and the like, arranged for recognizing the presence of animals in and/or on the bottom. Moreover, the detecting means can also be used for mapping the concentrations of animals, for instance for making population records. Here, no tines or startling means as described are used but the detecting means suffice, coupled to registering means with which the fish, crustacean and/or shellfish populations can be mapped so that developments can be recorded and the areas with for instance the most or, conversely, the least animals can be determined. The detecting means 21 are arranged such that therewith, animals 10 living on or in the water bottom 2 can be detected by specific reflection of the sound (see arrow P). Via a control device 22 such as a calculating unit, computer or the like, each detecting means 21 is coupled to a piston-cylinder assembly arranged immediately behind it and, hence, to a tine 14. In FIG. 3, the connection is shown for one assembly of a detecting means 21, a calculating unit 22 and a piston cylinder assembly 18 with tine 14. It will be clear that the detecting means 21 in the series 23 are each coupled to a piston-cylinder assembly 18 and tine 14 in the series 12, in a comparable manner, while, if desired, one central calculating unit 22 can suffice. In FIG. 3, only one connection of the hose 7A with a tine 14 is shown. It will be clear that each tine 14 is connected to the or each hose 7A in a comparable manner.

A device 5 according to FIGS. 2 and 3 can be used as follows.

The device 5 is coupled in the manner shown in FIG. 1 to the craft 3 and is dragged over the water bottom 2 in the direction V. As a result of the small forces occurring, the weight of the trawl 5 can be relatively small. With the aid of the piston-cylinder assemblies 18, the tines 14 are all brought in the second position, as shown for the tine 14A. With the aid of the detecting means 21, the bottom 2 just in front of the tines 14 is scanned for the presence of the desired animals 10. If an animal 10 is detected by a detecting means 21, via the calculating unit 22, the piston-cylinder assembly located immediately behind that and coupled therewith is controlled, so that the respective tine 14 is pushed from the second position into the bottom 2 to the first position, while via the nozzle 17, water is introduced into the bottom directly under the surface. The depth D over which the tine 14, at least nozzle 17, is pushed into the bottom is relatively small, for instance between virtually 0 and, for instance, 25 cm, more particularly between 0 and 7 cm. Mostly, an insertion depth of approximately 3 to 4 cm can suffice. Soil (sediment) of the water bottom 2 is slightly stirred up by the water jet W, exactly there where the animals such as cockles are present. The animals 10 then come to lie relatively free from the water bottom 2 and can be forced over the first part 15 of the tine 14 and along the contiguous second part 16 of the respective tine by advancing the device 5 in the direction V. Thus, the animals 10 are forced along the second part 16 from the sea bottom 2 and into the basket 8 where small parts such as sand, stone, small animals, small shells and the like can fall through the bottom 23 of the basket 8, back onto the sea bottom 2, while the animals 10 can be discharged to the craft 3 via the respective hose or tube 7B. To that end, for instance water can be sucked or pressed through the hose 71B, propelling means known per se such as venturis and the like can be used. Naturally, the animals 10 can also be collected in the device 5 or be discharged to a different craft or the like. Such a method of collecting and discharging animals is known per se in practice.

When upon further advancement of the device 5 in the direction V no animal, at least too low a density, is observed by a respective detecting means 21, the respective tine 14 is brought back into the second position with the aid of the respective piston-cylinder assembly 18, so that no disturbance of the sea bottom 2 occurs there where no animals can be collected. With the aid of the calculating unit 22, the density of animals can simply be determined by the detecting means 21, while, for instance, a limit value for density can be determined for inserting or not inserting one or more tines 14 into the bottom 2. As a result, the disturbance of the water bottom 2 can be reduced to a minimum.

In the exemplary embodiments shown, each time, a series 12 of tines 14 is provided, as well as a series of detecting means 21. It will be clear that any desired number of tines 14 can be provided as well as any number of detecting means 21, while, for instance also several tines 14 can be controlled by one detecting means or one tine can be controlled on the basis of signals generated by several detecting means. Suitable control software and/or hardware can simply be built in into the calculating unit 22. This calculating unit 22 can be of electronic as well as mechanic design, or a combination thereof.

In a variant embodiment (not shown), the tines can be inserted into the bottom 2 in a different manner, virtually straight by carrying out a translation instead of a rotation, for instance a slideable tine. Such a translation can be effected with the same or comparable means. Also, a combination of a rotating an translating movement can be opted for. Moreover, it is preferred that the axis 13 be height-adjustable relative to the runner 6, so that the insertion depth D can be set, for instance depending on the animals to be collected, the condition of the bottom and the like. Although the outflow direction W in FIG. 2 is shown to be approximately parallel to the bottom 2, at least the plane V, this can naturally also include a gentle angle therewith, for instance such that the direction W is directed slightly in the direction of the plane V. As a result, even less agitation of the sea bottom can be effected. As a consequence of the local water injection, relatively little water at relatively little pressure can suffice. Moreover, the nozzle 17 can be designed such that water is substantially and/or upwardly directed.

In FIG. 4, schematically, an alternative embodiment of a device 5 according to the invention is shown, in the form of a trawl net. In this embodiment, a hauling loop 24 is provided, coupled, on the one side, to the runners 6 and, on the other side, to a hauling cable 4. Between the runners 6, a pole 25 is provided on which a series of detecting means 21 and electric means 22, arranged alternately, is provided. In this embodiment, the detecting means 21 are arranged for transmitting, for instance in the direction of movement V, sounds signals P, directed forwards and somewhat in the direction of the bottom 2. When the sound signal P hits an animal 10, such as a flatfish on or slightly in the bottom 2, then, an adjacent electric means 22 is controlled for building up an electric and/or magnetic field, in a manner known per se. To this end, for instance an electric coil or the like can be controlled. The electric and/or magnetic field T, schematically indicated in FIG. 4 around an electric means 22 is sensed by the animal 10 and experienced as less agreeable. This results in the animal 10 swimming somewhat upwards, away from the bottom 2. Behind the runners 6, a net 26 is tautened which is held at a limited distance from the bottom with a forward open front side 27, turned in the direction of the pole 25. The animal 10, chased from the bottom 2 in the earlier described manner, will swim over or under the beam 5, at least the beam 25 will be moved along the animal 10, so that the animal 10 will end up in the net 26. Naturally, instead of a net, also a different capturing means can be used, such as a cage.

Since the detecting means 21 mentioned are used for detecting animals 10, in particular individually, simple electric means 22 and relatively light electric and/or magnetic fields T suffice. As a result, with minimum energy, in a particularly economical manner, the collection of animals 10 becomes possible. It will be clear that the electric means as shown in FIG. 4 can also be used with a device according to FIGS. 2 and 3, while the animals 10, for instance with a device according to FIG. 4, can also be chased in a different manner, for instance by providing, instead of electric means 22, means for generating specific air or water jets aimed at the animal 10, so that it swims upwards away from the bottom 2. With a device according to FIG. 4 too, tines 14 can be used for guiding animals into the net 26.

With a method and device according to the invention, with the aid of the detecting means 21, concentrations of animals 10 can be tracked down, at least detected, so that specific agitations of the bottom can be reduced to a minimum, while a device 5 according to the invention can be of particularly light design, notably so in that little buoyant force is applied on the device during moving. As the device 5 can be of relatively light design, it can be dragged with relatively light crafts, i.e. with relatively little power, so that as a result of the drives of the craft, relatively little agitation will occur in the water. Moreover, this requires relatively little energy and in a relatively short period of time, a high efficiency can be obtained as collection only takes place there where the animals are present in a desired concentration. Naturally, also with relatively expensive animals, collecting a few animals could be economically worthwhile. As a result of the limited agitation of the bottom, moreover, the quality of the fished animals can be improved, as they will take up relatively little sand, sediment or other contaminations.

Instead of or in addition to electric means, drivable by the detection means, naturally, also different means can be used, for instance mechanical means such as short chains moveable in a controlled manner, alarms, vibrating or jolting elements and the like, acoustic means such as sound sources, or means for generating fluid jets, to be directed at the animals.

With a device and method according to the invention, it is preferred that detection means and/or the control means be arranged for speed measurement for the purpose of determining the location of the animals relative to the tines, so that a tine can be inserted into the bottom still more accurately, just before arriving at the respective animal. Also, the detecting means can be arranged such that the depth at which the animals are present can be determined.

Figure 5:
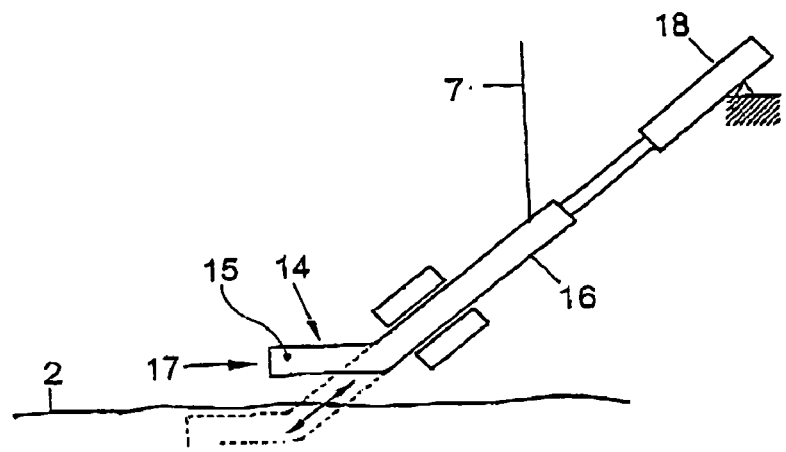
FIG. 5 schematically shows an alternative device for a tine.

In a variant shown in FIG. 5, a tine 14 is linearly moveable with the aid of the piston-cylinder assembly 18. With it, the knife is moved into and from the bottom in a translating manner.

Figure 6:
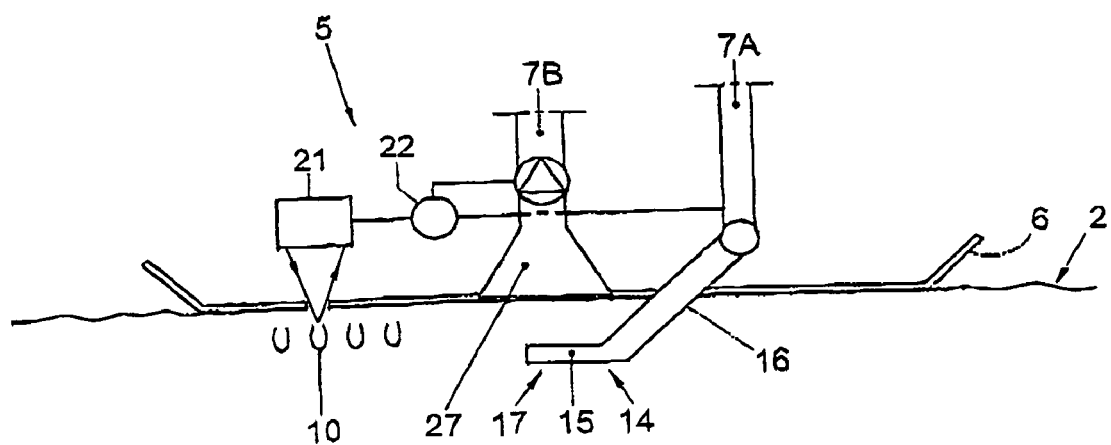
FIG. 6 schematically shows a part of an alternative embodiment of a device according to the invention with suction means for taking up animals.

In FIG. 6, a variant is shown in which suction means 27 are disposed, near the tines, at least behind the detecting means 21, with which the animals can be sucked from the bottom and be discharged via the hose 7. The suction means 27 are operated by the detecting means, at least the control unit 22, so that suction only takes place when a desired amount of animals has been detected. Thus, the bottom agitation can be still further limited. When used in a sufficiently loose bottom or with sufficient suction power and/or at a limited depth, optionally, the tines can be omitted and introducing a fluid such as water, gas or slurry into the bottom can be dispensed with.

The invention is not limited in any manner to the exemplary embodiments represented in the description and the drawing. Many variations thereon are possible within the framework of the invention as outlined by the claims.

For instance, a collecting device 5 according to the invention can be borne and/or advanced in a different manner, for instance by series of wheels or caterpillar tracks, by several runners and the like. The tines may be moved in a different manner, for instance electrically, pneumatically or hydraulically while, for instance, rotation of the axis 13 can ensure the desired movement. Water can be injected into the bottom in a different manner, for instance by means arranged separately from the tines 14, while also different fluids can be used, for instance air. Different numbers of tines, detection means and electrical means can be used, while also different driving means can be provided. Water for injection can also be supplied in a different manner, for instance by pumping means placed directly on the device 5. Different detecting means can be used, in addition to or instead of the sound detecting means, such as, for instance, infrared detecting means, means for detecting gas bubbles, movement, sound or the like, generated by the animals, means for determining electric fields and such generated by the animals. These and many comparable variations are understood to fall within the framework of the invention as outlined by the claims.

The invention claimed is:

1. A device for collecting animals from a bottom of a body of water comprising:

a support frame having at least one runner movable along a bottom surface of a body of water;

an animal detector provided on said support frame for detecting the presence of animals in a vicinity of said support frame;

an animal mover provided on said support frame, said animal mover being activatable by said animal detector upon the detection of the presence of animals to move the detected animals from the bottom of the body of water; and an animal collector for collecting the moved animals;

wherein said animal mover comprises at least one tine movable between a first position, wherein said at least one tine is extended below an underside of said runner such that said at least one tine is inserted below the bottom surface of the body of water, and a second position, wherein said at least one tine is retracted above said underside of said runner such that said at least one tine is removed from the bottom surface of the body of water, said at least one tine being driven by said animal detector and including a fluid outlet for applying a fluid under pressure into the bottom surface of the body of water when said at least one tine is in said first position.

2. A device for collecting animals living in or on a water bottom, provided with:

supporting means for support on a water bottom;

detecting means supported on said supporting means for detecting animals in or on the water bottom; and means for moving the animals from or off the water bottom, said means for moving the animals being supported on said supporting means and being drivable on a basis of a signal to be delivered by the detecting means, wherein the means for moving the animals from or off the water bottom comprises at least one tine which, during use, is extendable below a plane defined by undersides of the supporting means, at least into the bottom, and water supply means for, during use, introducing water under pressure into the bottom, at most at a gentle angle relative to said plane, at least to a bottom over which the device can be moved, said tine being further retractable above the plane defined by said undersides of said supporting means in an absence of a signal from said detecting means, and wherein said at least one tine comprises a row of tines being provided, and wherein means are provided for selectively moving each individual tine of said row of tines with respect to said row of tines between a first position in which the respective individual tine extends, during use, at least partly into the bottom, and a second position in which the respective tine is retracted above the bottom, wherein each individual tine of said row of tines is independently movable based on a detection of an animal by said detecting means at said respective tine.

3. A device according to claim 2, wherein each individual tine of said row of tines is provided with a free end extending, at least in a position of use, approximately parallel to said plane and at least a top side of the water bottom, while the water supply means are arranged for introducing water approximately parallel to said free end.

4. A device according to claim 2, wherein the means for moving the animals from or off the water bottom comprise electric or mechanical means for generating at least one of a current surge, a magnetic field, an electric field and a vibration field.

5. A device according to claim 4, wherein a series of electric means is provided, as well as a series of detecting means, such that over a relatively large width animals can be detected, at different positions in front of the device and, depending thereon, different electric means in the series can be operated.

6. A device for collecting animals from a bottom of a body of water comprising:
   a support frame having at least one runner movable along a bottom surface of a body of water;
   an animal detector provided on said support frame for detecting the presence of animals in a vicinity of said support frame;
   an animal mover provided on said support frame, said animal mover being activatable by said animal detector upon the detection of the presence of animals to move the detected animals from the bottom of the body of water; and
   an animal collector for collecting the moved animals,
   wherein said animal mover comprises at least one tine movable between a first position, wherein said at least one tine is extended below a plane defined by an underside of said runner such that said at least one tine is inserted below the bottom surface of the body of water, and a second position, wherein said at least one tine is retracted above said plane defined by said underside of said runner such that said at least one tine is removed from the bottom surface of the body of water, said at least one tine being driven by said animal detector and including a fluid outlet for applying a fluid under pressure into the bottom surface of the body of water when said at least one tine is in said first position, and
   wherein said at least one tine of said animal mover comprises a plurality of tines, each individual tine being selectively, independently movable with respect to the others based upon the detection by said animal detector of the presence or absence of an animal at said respective individual tine.

7. A method for collecting animals from a bottom of a body of water comprising the steps of:
   moving a collecting device along a bottom surface of a body of water;
   detecting a presence of animals in front of said collecting device;
   applying a fluid under pressure below the bottom surface of the body of water upon detection of the presence of animals in front of said collecting device; and
   collecting animals dislodged by said applied fluid under pressure,
   wherein said collecting device includes an underside movable along the bottom surface of the body of water, and said step of applying a fluid under pressure includes the step of extending a tine provided on said collecting device below said collecting device underside into the bottom surface, said tine including a nozzle for applying said fluid under pressure.

8. A method as defined in claim 7, further including the step of retracting said tine above said collecting device underside to remove said tine from below the bottom surface upon detection of an absence of animals in front of said collection device.

9. A method as defined in claim 7, wherein said tine comprises a plurality of tines and said step of applying a fluid under pressure comprises the step of selectively applying a fluid under pressure from one of said plurality tines extending below the bottom surface of the body of water upon detection of the presence of an animal in front of said one tine, wherein each tine of said plurality of tines is independently activatable.

10. A method for collecting animals living on or in a water bottom, the method comprising:
   providing a collecting device which can be moved over the bottom in a first direction, said collecting device is provided with means for moving the animals from or off the water bottom, said means for moving including at least one tine that can penetrate into the bottom and with which said animals can be taken or forced from or off the bottom, said at least one tine is provided with fluid outlet means through which, under pressure, a fluid can be forced into the bottom, such that a top layer of the bottom is stirred up and animals living therein or thereon are dislodged, which animals are caught in the collecting device, and wherein detecting means are provided on the collecting device in front of the at least one tine when viewed in said first direction, with which a presence of animals in or on the bottom is detected, operating means are also provided on the collecting device for moving the at least one tine, which are activated on a basis of signals of said detecting means, an arrangement being such that the at least one tine is only moved into the bottom when the detecting means in front of the at least one tine detects the presence of animals in or on the bottom, and is moved from the bottom again when no more animals are detected in front of the at least one tine, and wherein said at least one tine is extendable below an underside of said collecting device for moving said at least one tine into the bottom, and is retractable above said underside of said collecting device for removing said at least one tine from said bottom in an absence of a signal from said detecting means;
   moving said collecting device over the bottom in said first direction;
   detecting the presence of animals in front of said collecting device using said detecting means;
   activating said operating means to move said at least one tine on the basis of the signals of said detecting means;
   applying a fluid under pressure through said fluid outlet means below the bottom upon detection of the presence of animals in front of said collecting device; and
   collecting animals dislodged by said applied fluid under pressure.

11. A method according to claim 10, wherein said step of providing a collecting device further including said at least one tine comprising a plurality of tines being provided and the collecting device can be moved in said first direction over the bottom and the step of applying a fluid under pressure further includes said fluid being selectively forced into the bottom in approximately the same direction from an individual tine of said plurality of tines based on the detecting means detecting the presence of an animal in front of said individual tine, wherein each tine of said plurality of tines is independently activatable.

12. A method according to claim 10, wherein the step of applying a fluid under pressure further including said fluid being introduced into the bottom less than 25 cm below a surface of the bottom.

13. A method according to claim 10, wherein the step of providing a collecting device further including, viewed in said first direction, in front of the at least one tine, detecting means are provided with which the presence of animals in or on the bottom is detected, operating means are provided for controlling electric means arranged near the at least one tine, for generating at least one of current impulses, an electric field, and a magnetic field, which means are activated on the basis of signals of said detecting means, the arrangement being such that said electric means are only activated when the detecting means in front of the at least one tine detects the presence of animals in or on the bottom and the at least one tine is moved from the bottom again when no more animals are detected in front of the at least one tine.

14. A method according to claim 10, wherein the step of detecting the presence of animals further includes the animals being detected with the aid of sound.

* * * * *